United States Patent [19]

Butin

[11] 4,234,867
[45] Nov. 18, 1980

[54] THRESHOLD DEVICE FOR DISTINGUISHING THE WHITE LEVEL FROM THE BLACK LEVEL IN AN INPUT SIGNAL DELIVERED BY A READING HEAD FOR ANALYZING A DOCUMENT

[75] Inventor: Henri Butin, Paris, France

[73] Assignee: Thomson-CSF, Paris, France

[21] Appl. No.: 73,855

[22] Filed: Sep. 10, 1979

[30] Foreign Application Priority Data

Sep. 8, 1978 [FR] France .................................. 78 25850

[51] Int. Cl.³ ........................ G06K 9/38; H03K 5/153
[52] U.S. Cl. ............................ 340/146.3 AG; 307/358
[58] Field of Search ............ 340/146.3 AG; 307/358, 307/351, 353; 328/150, 151; 358/163, 166, 167, 174, 282, 284

[56] References Cited

U.S. PATENT DOCUMENTS

| | | |
|---|---|---|
| 3,321,637 | 5/1967 | Beltz et al. ................ 340/146.3 AG |
| 3,599,151 | 8/1971 | Harr .......................... 340/146.3 AG |
| 3,715,724 | 2/1973 | Demonte et al. ......... 340/146.3 AG |
| 3,973,239 | 8/1976 | Kakumoto et al. ....... 340/146.3 AG |
| 4,003,021 | 1/1977 | Sasaki et al. .............. 340/146.3 AG |
| 4,078,227 | 3/1978 | Fahey et al. .............. 340/146.3 AG |
| 4,159,432 | 6/1979 | Burke et al. .......................... 307/358 |
| 4,162,408 | 7/1979 | Hansen ...................... 340/146.3 AG |

*Primary Examiner*—Leo H. Boudreau
*Attorney, Agent, or Firm*—Roland Plottel

[57] ABSTRACT

The threshold device comprises a comparator for comparing the input signal with a threshold voltage and delivering an output signal having a first level when the level of the input signal is a white level and a second level when the level of the input signal is a black level. Storage means memorize the value of the level of the input signal when the level of the output signal of the comparator corresponds to a white level. Said storage means deliver a voltage which is representative of a fraction of the value of the stored input signal level and which constitutes the threshold voltage.

4 Claims, 1 Drawing Figure

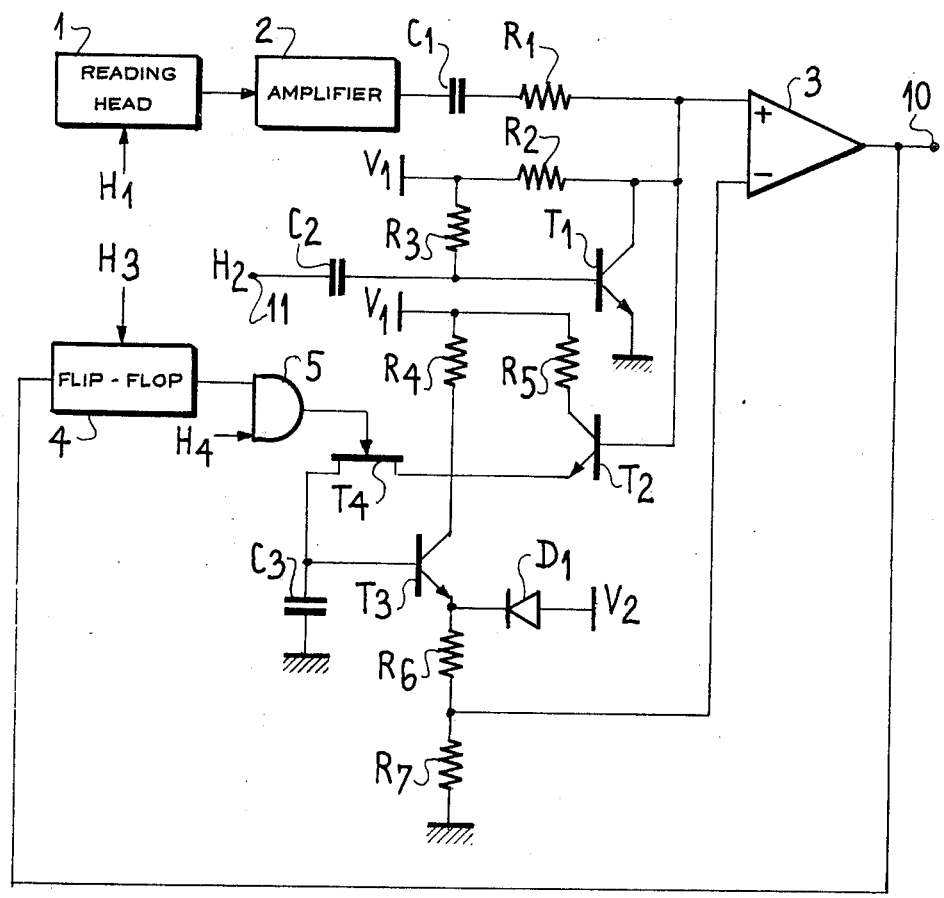

THRESHOLD DEVICE FOR DISTINGUISHING THE WHITE LEVEL FROM THE BLACK LEVEL IN AN INPUT SIGNAL DELIVERED BY A READING HEAD FOR ANALYZING A DOCUMENT

This invention relates to threshold devices for distinguishing the white level from the black level by means of signals delivered by a reading head for analyzing a document.

In order to make this distinction when analyzing a document with a reading head, a known practice consists in making use of threshold devices of the type comprising an amplifier for the signals delivered by the reading head, said amplifier being connected directly to a first input of a comparator and to a second input of said comparator through integrating means. These integrating means deliver a threshold voltage resulting from integration of the output signals of the amplifier. However, this threshold voltage is inaccurate by reason of the fact that the white level varies in particular with the level of illumination and the ground color of the document.

The aim of the present invention is to overcome this disadvantage. According to the invention there is provided a threshold device for distinguishing the white level from the black level in a first signal delivered by the output of a reading head for analyzing a document, and comprising amplification means having one input coupled to the output of the reading head and one output for delivering a second signal, a comparator having a first input coupled to the output of the amplification means, a second input and an output for delivering a signal having a first level when the level of the first signal is a white level and a second level when the level of the first signal is a black level, storage means having one input coupled to the output of the amplification means for storing the value of the level of the second signal, a control input coupled to the output of the comparator for controlling the storage operation under the action of the first level and an output coupled to the second input of the comparator in order to deliver a signal which is representative of a fraction of the value of the level of the second stored signal.

Further advantages will become apparent from the following description which will serve to gain a more complete understanding of the invention, reference being made to the accompanying FIGURE which illustrates a threshold device according to the invention.

In this FIGURE, the output signals of a reading head 1 controlled by a clock signal $H_1$ are applied to the input of an amplifier 2, the output of which is connected to the positive input of a comparator 3 through a capacitor $C_1$ and a resistor $R_1$ connected in series. The positive input of the comparator 3 is also connected to the collector of an n-p-n transistor $T_1$, the emmitter of which is connected to ground and the base of which is connected to an input terminal 11 to which a clock signal $H_2$ is applied through a capacitor $C_2$. A positive voltage $V_1$ is applied to the collector and the base of said transistor $T_1$ respectively through resistors $R_2$ and $R_3$. The positive input of the comparator 3 is also connected to the base of an n-p-n transistor $T_2$, the collector of which is connected to the supply voltage $V_1$ through a resistor $R_5$ and the emitter of which is connected to ground through the channel N of a field-effect transistor $T_4$ and a capacitor $C_3$ connected in series whilst the drain of transistor $T_4$ is connected to the emitter of the transistor $T_2$. The gate of transistor $T_4$ is fed from the output of an AND-gate 5, a first input of which receives a clock signal $H_4$ and a second input of which receives the output signal of an asynchronous flip-flop 4 controlled by a clock signal $H_3$. The output signal of the comparator 3 is applied to the input of said flip-flop and the output 10 of said comparator constitutes the output of the device. The voltage developed across the terminals of the capacitor $C_3$ applies a bias to the base of an n-p-n transistor $T_3$, the collector of which is connected to the voltage $V_1$ through a resistor $R_4$ and the emitter of which is connected on the one hand to ground through series-connected resistors $R_6$ and $R_7$ and on the other hand to a positive voltage $V_2$ through a diode $D_1$ which is forward-biased for the voltage $V_2$. The common node between resistors $R_6$ and $R_7$ is also connected to the negative input of the comparator 3.

The clock signal $H_1$ is a signal whose state "1" has a predetermined duration in order to permit reading of one point of a line.

The clock signal $H_2$ is complementary to the clock signal $H_1$ or, in other words, $H_2 = \overline{H_1}$.

The clock signal $H_3$ is in synchronism with the clock signal $H_1$ but the leading edges of its pulses have a predetermined time-lag with respect to those of the clock signal $H_1$ and the pulse-width of said clock signal $H_3$ is much smaller than the pulse-width of the clock signal $H_1$.

The clock signal $H_4$ is in synchronism with the clock signal $H_3$ but the leading edges of its pulses have a predetermined time-lag; the pulse-width of said clock signal $H_4$ is of the same order of magnitude as the pulse-width of the clock signal $H_3$. In addition, said clock signal $H_4$ is in state "1" during the last fraction of state "1" of the clock signal $H_1$.

The operation of this device consists in generating a threshold voltage representing a fraction of the voltage corresponding to the level of the white point previously read; the value of this voltage which is stored in a capacitor is modified at each white point reading and is applied to one input of a comparator; the signals corresponding to the read points are applied to the other input of said comparator.

The reading head 1 converts the light received into electrical signals at the time of reading of each point of a line of a document. The operation of said head is sampled by the clock signal $H_1$, the logical state "1" of which permits reading of one point of a line. The amplitude of the electrical signal delivered by said reading head 1 is of maximum value in respect of a white point and of minimum value in respect of a black point. The amplifier 2 transmits these electrical signals to the positive input of the comparator 3 through the capacitor $C_1$ and the resistor $R_1$ which are connected in series, are associated with the input impedance of the comparator and thus constitute a low time constant which does not produce any appreciable deformation of said signals.

When the clock signal $H_2$ is in state "1" (clock signal $H_1$ in state "0"), a positive voltage is applied to the base of the transistor $T_1$ and drives this latter into saturation.

The voltage applied to the positive input of the comparator 3 is then equal to the value of the collector-emitter voltage (or $V_{CE}$) of the saturated transistor $T_1$.

When the clock signal $H_2$ is in state "0" (clock signal $H_1$ in state "1"), the transistor $T_1$ is turned-off and the voltage at the positive input of the comparator 3 is in that case the output voltage of the reading head 1 corresponding to one point of a read line transmitted through the amplifier 2, the capacitor $C_1$ and the resistor $R_1$. At the positive input of said comparator 3, the signals are in fact aligned with the potential $V_{CE}$ of the saturated transistor $T_1$.

The voltage which is present at the positive input of the comparator 3 during state "0" of the clock signal $H_2$ charges the capacitor $C_3$ through the transistor $T_2$ which has a common-collector connection and the transistor $T_4$ operates as a switch controlled by the output signal of the AND-gate 5. This electronic switch is closed when the output signal of the AND-gate 5 is in state "1". The advantage of the transistor $T_2$ lies in the fact that it permits rapid charging of the capacitor $C_3$, taking into account the low output resistance of said transistor $T_2$.

If the first point of a line read by the reading head 1 is a white point, the output signal at the terminal 10 of the comparator 3 changes to the logical state "1" since the voltage applied to the negative input of this latter is either a fraction of the voltage $V_2$ (this fraction being obtained by the potentiometric divider constituted by the resistors $R_6$ and $R_7$), or a fraction of the stored voltage at the terminals of the capacitor $C_3$ (therefore a fraction of the voltage corresponding to a white level).

In the contrary case, the output signal at the terminal 10 of the comparator 3 changes to state "0".

The logical output states of said comparator 3 are stored within the asynchronous flip-flop 4 controlled by the leading edges of the pulses of the clock signal $H_3$. The output state of said flip-flop 4 is applied to the AND-gate 5 which is activated by the clock signal $H_4$.

When the point of a line read by the reading head 1 is white, the AND-gate 5 delivers a logical state "1" which closes the electronic switch constituted by the transistor $T_4$ and serves to charge the capacitor $C_3$.

When the point is black, the output signal of the memory circuit 4 is in state "0" and the capacitor is not charged by the voltage corresponding to the black point but stores in memory the voltage corresponding to the previous white point.

The advantage of the voltage $V_2$ associated with the diode $D_1$ lies in the fact that a threshold voltage is delivered when a first line of a document begins with black points.

It should be noted that the threshold voltage applied to the negative input of the comparator 3 is a predetermined fraction of the voltage corresponding to the level of the white point which had previously been read (by reason of the fact that the comparator 3 changes state before the voltage corresponding to the point which has been read is recorded) or of the last white point read in the case of a succession of black points. In practice, this threshold voltage is therefore adapted to each point which has been read.

Moreover, correct operation involves the following relations:

resistance $R_1$ of much higher value than the collector-emitter resistance of the saturated transistor $T_1$, resistance $R_1$ of much lower value than the resistance $R_2$ in order to ensure that practically the entire level is applied to the positive input of the comparator 3.

The invention is not limited to the embodiment hereinabove described and illustrated. In particular, the transistors $T_1$ to $T_4$ can be p-n-p bipolar transistors or field-effect transistors. Devices of this type can be employed especially in telecopying emitters.

What is claimed is:

1. A threshold device for distinguishing the white level from the black level in a first signal delivered by the output of a reading head for analyzing a document, and comprising amplification means having one input coupled to the output of the reading head and one output for delivering a second signal, a comparator having a first input coupled to the output of the amplification means, a second input and an output for delivering a signal having a first level when the level of the first signal is a white level and a second level when the level of the first signal is a black level, storage means having one input coupled to the output of the amplification means for storing the value of the level of the second signal, a control input coupled to the output of the comparator for controlling the storage operation under the action of the first level and an output coupled to the second input of the comparator in order to deliver a signal which is representative of a fraction of the value of the level of the second stored signal.

2. A threshold device according to claim 1, wherein the storage means comprise a capacitor having a first end which is intended to be coupled to a zero voltage source and a second end, an electronic switch having a signal input coupled to the output of the amplification means, a control input coupled to the output of the comparator, and an output coupled to the second end of the capacitor, a potentiometric divider having a first end coupled to the second end of the capacitor, a second end coupled to the zero voltage source, and an output for delivering a threshold voltage coupled to the second input of the comparator.

3. A threshold device according to claim 2, wherein the storage means comprise a diode having a cathode coupled to the signal input of the potentiometric divider and an anode which is intended to be coupled to a predetermined positive reference voltage source adapted to serve as a minimum threshold voltage.

4. A threshold device according to claim 1, wherein the first signal delivered by the reading head is a signal constituted by a sequence of samples spaced at uniform time intervals having a duration d, and wherein the storage means comprise an alignment circuit coupled to the first input of the comparator in order to align the level of the second signal with a predetermined level during the time intervals having a duration d.

* * * * *